US010830126B2

(12) United States Patent
Hrusch et al.

(10) Patent No.: US 10,830,126 B2
(45) Date of Patent: Nov. 10, 2020

(54) TWO-SPEED ACCESSORY DRIVE PULLEY

(71) Applicant: Schaeffler Technologies AG & Co. KG, Herzogenaurach (DE)

(72) Inventors: Nicholas Hrusch, Wooster, OH (US); Michael Swank, Shreve, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/456,137

(22) Filed: Jun. 28, 2019

(65) Prior Publication Data

US 2020/0003113 A1    Jan. 2, 2020

Related U.S. Application Data

(60) Provisional application No. 62/692,223, filed on Jun. 29, 2018.

(51) Int. Cl.
| | |
|---|---|
| *F16H 1/28* | (2006.01) |
| *F02B 67/06* | (2006.01) |
| *F16H 9/26* | (2006.01) |
| *F16D 41/04* | (2006.01) |
| *F16D 41/36* | (2006.01) |

(52) U.S. Cl.
CPC ............. *F02B 67/06* (2013.01); *F16D 41/04* (2013.01); *F16D 41/36* (2013.01); *F16H 1/2863* (2013.01); *F16H 9/26* (2013.01)

(58) Field of Classification Search
None
See application file for complete search history.

(56) References Cited

U.S. PATENT DOCUMENTS

| | | | | |
|---|---|---|---|---|
| 4,667,537 | A | * | 5/1987 | Sivalingham ............. F16H 3/54 475/256 |
| 5,558,592 | A | * | 9/1996 | Honlinger ................. F16H 3/56 464/180 |
| 7,727,115 | B2 | * | 6/2010 | Serkh ..................... B60K 25/00 477/115 |
| 7,758,465 | B2 | * | 7/2010 | Serkh .................. F16H 57/0006 475/318 |
| 8,444,322 | B2 | | 5/2013 | Langer et al. |
| 2013/0035193 | A1 | | 2/2013 | Janson et al. |
| 2019/0072138 | A1 | | 3/2019 | Ramsey |

FOREIGN PATENT DOCUMENTS

EP              2481622 A1 *  8/2012  ............. F16H 55/36

* cited by examiner

*Primary Examiner* — Dirk Wright
(74) *Attorney, Agent, or Firm* — Lekeisha Suggs

(57) ABSTRACT

A two-speed pulley assembly for an engine accessory drive includes a planetary gear, a pulley, a friction clutch, a one-way clutch, and a torsional isolator. The planetary gear has a ring gear, a sun gear, a planet carrier and at least one planet gear. The planet carrier is arranged for driving engagement with an engine crankshaft. The pulley circumscribes the ring gear and is in driving engagement with the ring gear. The friction clutch is arranged to selectively prevent rotation of the sun gear. The one-way clutch permits rotation of the sun gear relative to the ring gear in a first rotational direction, and prevents rotation of the sun gear relative to the ring gear in a second rotational direction, opposite the first rotational direction. The torsional isolator is drivingly connected to the planet carrier and arranged to rotate at a same speed as the planet carrier.

15 Claims, 2 Drawing Sheets

TWO-SPEED ACCESSORY DRIVE PULLEY

CROSS-REFERENCE TO RELATED APPLICATIONS

This application claims priority to U.S. Provisional Application No. 62/692,223 filed Jun. 29, 2018, the entire disclosure of which is incorporated by reference herein.

TECHNICAL FIELD

The present disclosure relates generally to an accessory drive pulley for an engine, and more specifically to a two-speed accessory drive pulley.

BACKGROUND

Conventionally, motor vehicle accessories are driven directly off the crankshaft pulley. The size of the crankshaft pulley typically determines the speed that the belt and accessories are driven at. U.S. Patent Application Publication No. 2013/0035193 to Jansen et al. describes a vehicle accessory drive system.

SUMMARY

Example aspects broadly comprise a two-speed pulley assembly for an engine accessory drive including an axis, a planetary gear, a pulley, a friction clutch, a one-way clutch, and a torsional isolator. The planetary gear has a ring gear, a sun gear, a planet carrier and at least one planet gear. The ring gear is rotatable about the axis. The planet carrier is arranged for driving engagement with an engine crankshaft. The planet carrier includes at least one planetary pin, radially offset from the axis. The at least one planet gear is rotatable relative to the planet carrier about the at least one planetary pin, and drivingly engaged with the ring gear and the sun gear. The pulley circumscribes the ring gear. The pulley is in driving engagement with the ring gear. The friction clutch is arranged to selectively prevent rotation of the sun gear. The one-way clutch is arranged between the sun gear and the ring gear. The one-way clutch permits rotation of the sun gear relative to the ring gear in a first rotational direction, and prevents rotation of the sun gear relative to the ring gear in a second rotational direction, opposite the first rotational direction. The torsional isolator is drivingly connected to the planet carrier and arranged to rotate at a same speed as the planet carrier.

In an example embodiment, the torsional isolator is at least partially disposed axially between the pulley and an engine block. In some example embodiments, the two-speed pulley assembly includes a crankshaft hub arranged for fixing to the engine crankshaft. The planet carrier is drivingly engaged with the crankshaft hub by a face spline. In an example embodiment, the two-speed pulley assembly includes a crankshaft balance weight installed on the crankshaft hub.

In some example embodiments, the two-speed pulley assembly includes a drive plate and a bearing. The drive plate is fixed to the planet carrier and includes a drive plate spline. The bearing is arranged in a radial space between the drive plate and the pulley. In an example embodiment, the torsional isolator includes a torsional isolator spline drivingly engaged with the drive plate spline. In an example embodiment, the ring gear and the pulley are integrated into a single component made from a single piece of material.

In some example embodiments, the friction clutch includes an output plate, a piston, and an electromagnet. The output plate is arranged for fixing to an engine block and includes a first conical surface. The piston is drivingly engaged with the sun gear and includes a second conical surface arranged for frictional engagement with the first conical surface. The electromagnet is arranged to displace the piston in a first axial direction to frictionally engage the second conical surface with the first conical surface. In an example embodiment, the two-speed pulley assembly includes a snap ring. The sun gear has a sun gear hub with a sun gear hub groove and the snap ring is installed in the sun gear hub groove to limit an axial displacement of the piston a second axial direction, opposite the first axial direction.

In an example embodiment, the two-speed pulley assembly includes a resilient element arranged to displace the piston in a second axial direction, opposite the first axial direction, to disengage the second conical surface form the first conical surface. In an example embodiment, the electromagnet is fixed to the output plate. In an example embodiment, the pulley has a pulley outer diameter and the electromagnet has an electromagnet inner diameter, greater than the pulley outer diameter. In an example embodiment, the first conical surface and the second conical surface are disposed radially outside of and at least partially axially aligned with the electromagnet.

In some example embodiments, the two-speed pulley assembly includes a sealed chamber for filling with a lubricating oil. In an example embodiment, the at least one planetary pin has a plurality of flow channels for distributing the lubricating oil.

BRIEF DESCRIPTION OF THE DRAWINGS

The nature and mode of operation of the present disclosure will now be more fully described in the following detailed description of the present disclosure taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the present disclosure, the following example methods, devices, and materials are now described.

Figure 1:
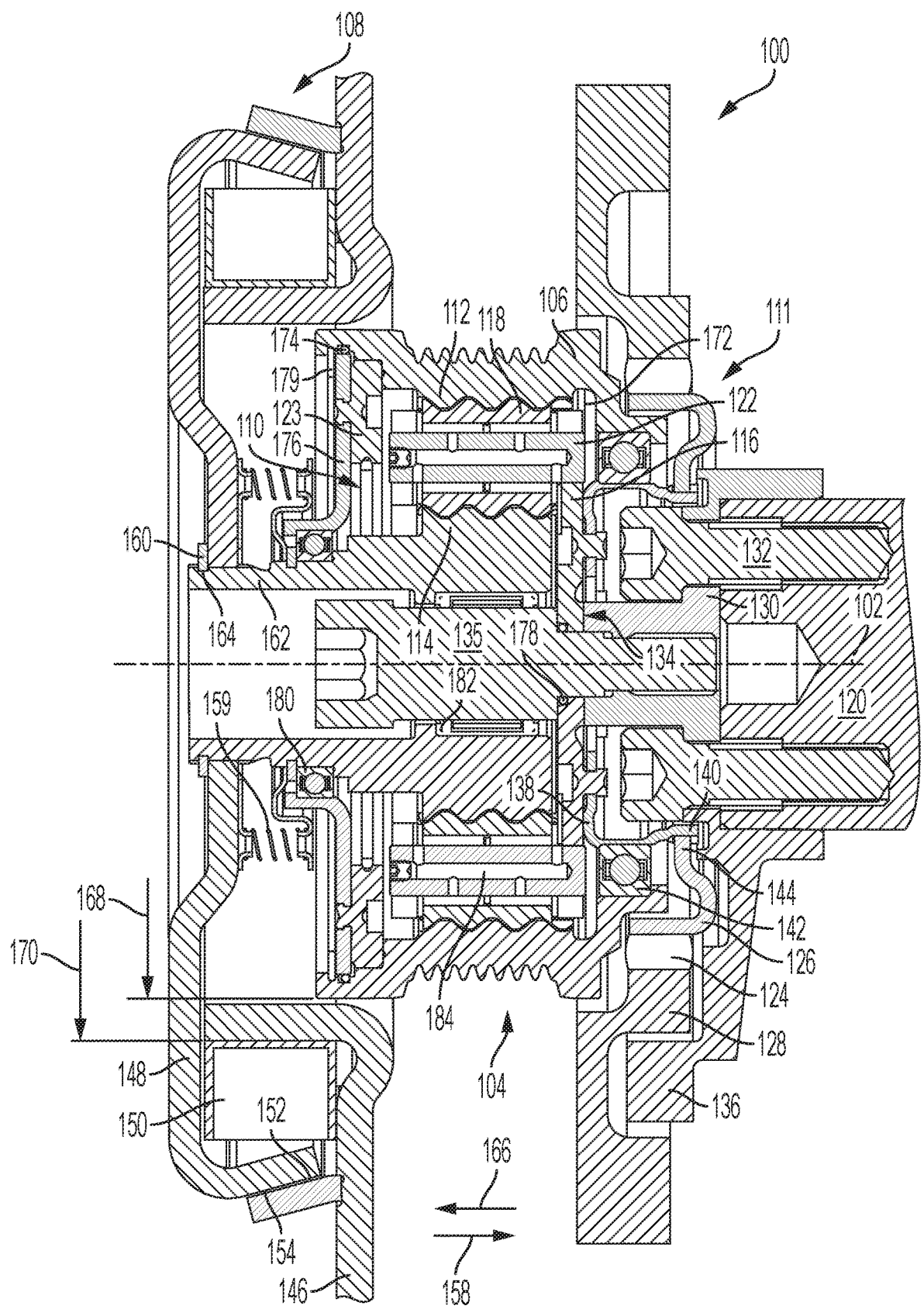
FIG. 1 illustrates a sectional view of a two-speed accessory drive pulley according to an example aspect.
Figure 2:
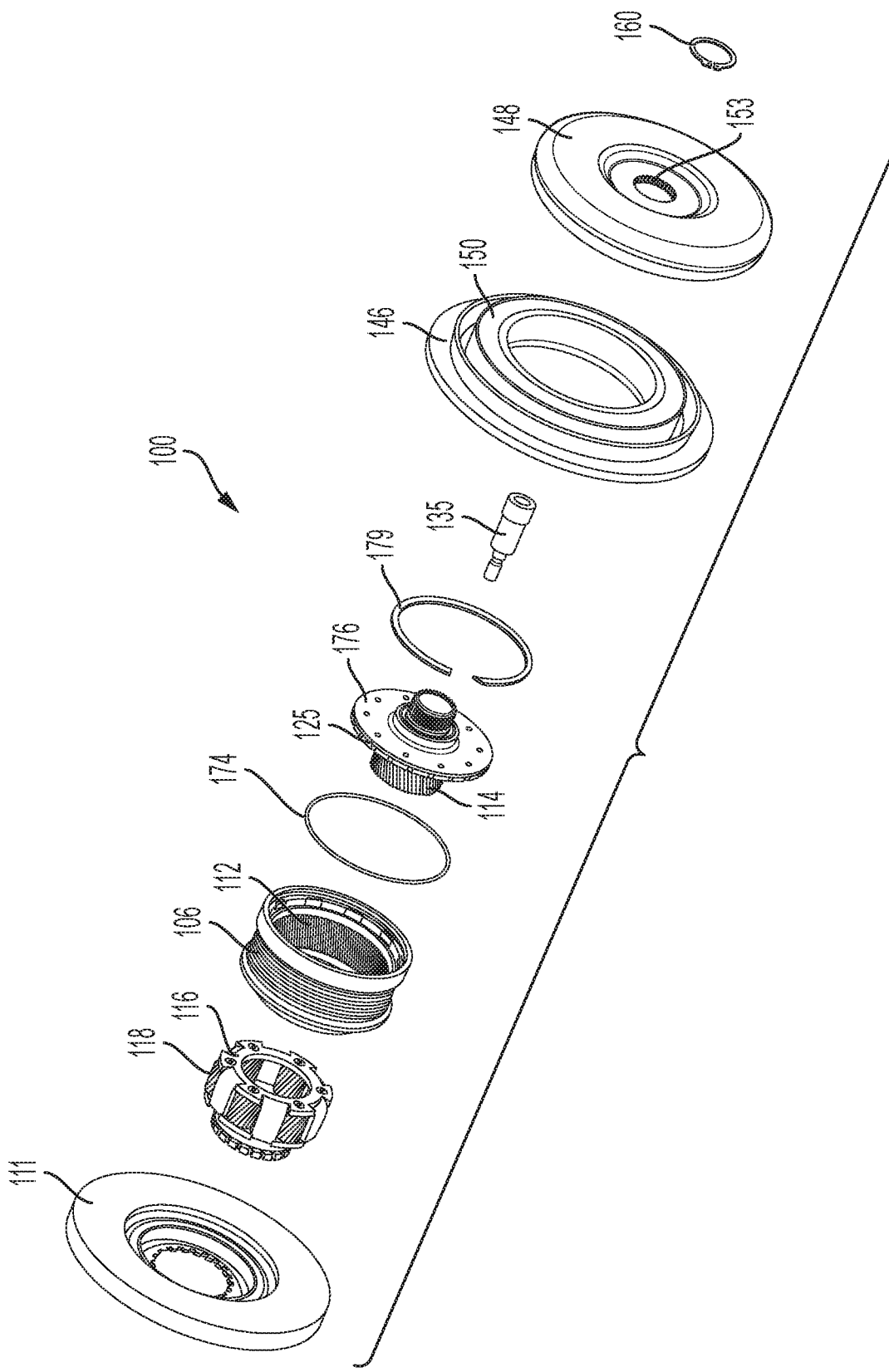
FIG. 2 illustrates an exploded view of the two-speed accessory drive pulley of FIG. 1.

The following description is made with reference to FIGS. 1 and 2. FIG. 1 illustrates a sectional view of two-speed accessory drive pulley 100. FIG. 2 illustrates an exploded view of the two-speed accessory drive pulley of FIG. 1. Two-speed pulley assembly 100 is for an engine accessory drive. That is, pulley assembly 100 may be part of an engine accessory drive including an alternator, water pump, power steering pump, air conditioning compressor, or other known engine accessories. Known accessory drives connect the various components rotationally via a belt and pulleys. Pulley assembly 100 is described for installation on an engine crankshaft, though other embodiments are possible. For example, pulley assembly 100 may replace a single-speed pulley on a single accessory or multiple accessories.

Pulley assembly 100 includes axis 102, planetary gear 104, pulley 106, friction clutch 108, one-way clutch 110, and torsional isolator 111. Planetary gear 104 includes ring gear 112 rotatable about the axis, sun gear 114, planet carrier 116, and planet gear 118. Planet carrier 116 is arranged for driving engagement with engine crankshaft 120 and includes planet pin 122. Planet gear 118 is rotatable relative to the planet carrier about the planetary pin and drivingly engaged with the ring gear and the sun gear. That is, the ring gear, sun gear, and planetary gear each have mating teeth so that they rotate together about their respective axes.

Pulley 106 circumscribes the ring gear and is in driving engagement with the ring gear. In the embodiment shown in FIG. 1, ring gear 112 and pulley 106 are integrated into a single component made from a single piece of material. Other embodiments (not shown) may include the pulley fixed directly to the ring gear or fixed to another component fixed to the ring gear.

Friction clutch 108 is arranged to selectively prevent rotation of the sun gear as described in more detail below. One-way clutch 110 is arranged between the sun gear and the ring gear. The one-way clutch 110 permits rotation of the sun gear 114 relative to the ring gear 112 in a first rotational direction and prevents rotation of the sun gear 114 relative to the ring gear 112 in a second rotational direction, opposite the first rotational direction. In the example embodiment shown in FIG. 1, one-way clutch 110 is a wedge clutch. An example wedge clutch is shown and described in commonly-assigned U.S. patent application Ser. No. 15/695,728 titled WEDGE PLATE WITH ANGLED STRUTS AND ONE-WAY WEDGE CLUTCH WITH WEDGE PLATE HAVING ANGLED STRUTS to Ramsey, hereby incorporated by reference as if set forth fully herein. Although one-way clutch 110 is shown as a wedge clutch, other embodiments are possible. For example, one-way clutch 110 may be a roller clutch or a sprag clutch, as is known in the art. Outer race 123 is drivingly engaged with pulley 106 via teeth 125.

Torsional isolator 111 is drivingly connected to the planet carrier 116 and arranged to rotate at a same speed as the planet carrier 116. In the embodiment shown in FIG. 1, torsional isolator 111 isolator portion 124 is radially disposed between metal plates 126 and 128. Portion 124 may include an elastomer such as rubber or a polymer, for example. Torsional isolator 111 is at least partially disposed axially between the pulley and an engine block (not shown).

Two-speed pulley assembly 100 includes crankshaft hub 130 arranged for fixing to engine crankshaft 120 by bolts 132, for example. Planet carrier 116 is drivingly engaged with the crankshaft hub by face spline 134. That is, carrier 116 and hub 130 include mating face splines and are pulled into contact by central bolt 135. An example face spline is shown and described in commonly-assigned U.S. Pat. No. 8,444,322 titled FACE SPLINE FOR A DRIVEN HUB to Langer et al., hereby incorporated by reference as if set forth fully herein. Crankshaft balance weight 136 is installed on the crankshaft hub.

Two-speed pulley assembly 100 includes drive plate 138 fixed to planet carrier 116. Drive plate 138 includes drive plate spline 140. Bearing 142 is arranged in a radial space between drive plate 138 and pulley 106 and facilitates relative rotation of ring gear 112 and planet carrier 116. Torsional isolator 111 includes torsional isolator spline 144 drivingly engaged with drive plate spline 140.

Friction clutch 108 includes output plate 146, piston 148, and electromagnet 150. Output plate 146 is arranged for fixing to an engine block (not shown) and includes conical surface 152. Piston 148 is drivingly engaged with the sun gear at spline 153 (FIG. 2) and includes conical surface 154 arranged for frictional engagement with the conical surface 152 of output plate 146. Friction material may be affixed to conical surface 152 or conical surface 154. Electromagnet 150 is fixed to output plate 146 and arranged to displace the piston in axial direction 158 to frictionally engage the conical surface 154 with the conical surface 152. That is, when energized, the electromagnet pulls the piston towards the electromagnet to close an air gap and engage the friction clutch. Resilient element 159 is arranged to displace the piston in axial direction 166 to disengage conical surface 154 from conical surface 152. In the embodiment shown in FIG. 1, resilient element 159 is a plurality of coil springs.

Two-speed pulley assembly 100 includes snap ring 160. Sun gear 114 includes sun gear hub 162 with sun gear hub groove 164 and the snap ring is installed in the sun gear hub groove to limit an axial displacement of the piston in axial direction 166. Axial direction 166 is opposite axial direction 158. In the embodiment shown in FIG. 1, sun gear 114 and sun gear hub 162 are integral and formed from a same piece of material but other embodiments are possible. For example, gear 114 and hub 162 may be separate components drivingly engaged by splines, or fixed together by staking, welding or rivets, for example.

Pulley 106 includes outer diameter 168 and electromagnet 150 includes inner diameter 170, greater than outer diameter 168. Conical surfaces 152 and 154 are disposed radially outside of and at least partially axially aligned with the electromagnet.

Two-speed pulley assembly 100 includes sealed chamber 172 for filling with a lubricating oil (not shown). The is, pulley assembly 100 includes seal 174 for sealing carrier plate 176 to pulley 106, and seal 178 for sealing planet carrier 116 to central bolt 135. Carrier plate 176 is fixed to outer race 123 and axially fixed in pulley 106 by snap ring 179. Bearing 142 is a sealed bearing. Similarly, bearing 180 for facilitating relative rotation between sun gear 114 and planet carrier 116, and bearing 182 for facilitating relative rotation between sun gear 114 and central bolt 135, are sealed bearings. Planetary pin 122 includes flow channels 184 for distributing the lubricating oil.

During normal operation, torque from the crankshaft 120 enters the carrier 116 and planet pin 122 before passing through the sun gear 114, one-way clutch 110, and ring gear 112 and exits through the pulley 106. The one-way clutch 110 locks the sun gear 114 and the ring gear 112 together so that the entire planetary gear spins as one unit and the pulley 106 rotates at the same speed as the crankshaft 120.

During overspeed operation, when the electromagnet 150 is energized and the friction clutch 108 is engaged, the sun gear 114 is prevented from rotating. Torque from the crankshaft 120 enters the planetary carrier 116. Rotation of the planetary carrier 116 rotates the planet gears 118 and, because the sun gear 114 is rotationally fixed, torque in the planet gear reacts against the sun gear 114 and passes through the ring gear 112 to the pulley 106, resulting in an overspeed ratio between the pulley 106 and the crankshaft 120. That is, the pulley 106 spins faster than the crankshaft 120 when the electromagnet 150 is energized and the friction clutch 108 is engaged. The one-way clutch 110 freewheels because the ring gear 112 is rotating faster than the sun gear 114. When normal operation is desired, the electromagnet 150 is de-energized and the coil springs push the piston 148 away from the output plate 146, allowing rotation of the sun gear 114.

Of course, changes and modifications to the above examples of the present disclosure should be readily apparent to those having ordinary skill in the art, without departing from the spirit or scope of the present disclosure as claimed. Although the present disclosure is described by reference to specific preferred and/or example embodiments, it is clear that variations can be made without departing from the scope or spirit of the present disclosure as claimed.

LIST OF REFERENCE NUMERALS

100 Two-speed accessory drive pulley
102 Axis
104 Planetary gear
106 Pulley
108 Friction clutch
110 One-way clutch
111 Torsional isolator
112 Ring gear
114 Sun gear
116 Planet carrier
118 Planet gear
120 Engine crankshaft
122 Planet pin
123 Outer race
124 Isolator portion
125 Teeth
126 Metal plate
128 Metal plate
130 Crankshaft hub
132 Bolts
134 Face spline
135 Central bolt
136 Crankshaft balance weight
138 Drive plate
140 Drive plate spline
142 Bearing
144 Torsional isolator spline
146 Output plate
148 Piston
150 Electromagnet
152 Conical surface (output plate)
153 Spline
154 Conical surface (piston)
158 Axial direction
159 Resilient element
160 Snap ring
162 Sun gear hub
164 Sun gear hub groove
166 Axial direction
168 Pulley outer diameter
170 Electromagnet inner diameter
172 Sealed chamber
174 Seal
176 Carrier plate
178 Seal
179 Snap ring
180 Bearing
182 Bearing
184 Flow channels

What we claim is:

1. A two-speed pulley assembly for an engine accessory drive comprising:
    an axis;
    a planetary gear comprising:
        a ring gear rotatable about the axis;
        a sun gear;
        a planet carrier arranged for driving engagement with an engine crankshaft and including at least one planetary pin, radially offset from the axis; and
        at least one planet gear:
            rotatable relative to the planet carrier about the at least one planetary pin; and
            drivingly engaged with the ring gear and the sun gear;
    a pulley circumscribing the ring gear and in driving engagement with the ring gear;
    a friction clutch arranged to selectively prevent rotation of the sun gear;
    a one-way clutch arranged between the sun gear and the ring gear that:
        permits rotation of the sun gear relative to the ring gear in a first rotational direction; and
        prevents rotation of the sun gear relative to the ring gear in a second rotational direction, opposite the first rotational direction; and
    a torsional isolator drivingly connected to the planet carrier and arranged to rotate at a same speed as the planet carrier.

2. The two-speed pulley assembly of claim 1 wherein the torsional isolator is at least partially disposed axially between the pulley and an engine block.

3. The two-speed pulley assembly of claim 1 further comprising a crankshaft hub arranged for fixing to the engine crankshaft, wherein the planet carrier is drivingly engaged with the crankshaft hub by a face spline.

4. The two-speed pulley assembly of claim 3 further comprising a crankshaft balance weight installed on the crankshaft hub.

5. The two-speed pulley assembly of claim 1 further comprising:
    a drive plate fixed to the planet carrier and including a drive plate spline; and
    a bearing arranged in a radial space between the drive plate and the pulley.

6. The two-speed pulley assembly of claim 5 wherein the torsional isolator includes a torsional isolator spline drivingly engaged with the drive plate spline.

7. The two-speed pulley assembly of claim 1 wherein the ring gear and the pulley are integrated into a single component made from a single piece of material.

8. The two-speed pulley assembly of claim 1 wherein the friction clutch comprises:
    an output plate arranged for fixing to an engine block, the output plate comprising a first conical surface;
    a piston, drivingly engaged with the sun gear and comprising a second conical surface arranged for frictional engagement with the first conical surface; and
    an electromagnet arranged to displace the piston in a first axial direction to frictionally engage the second conical surface with the first conical surface.

9. The two-speed pulley assembly of claim 8 further comprising a snap ring, wherein the sun gear comprises a sun gear hub with a sun gear hub groove and the snap ring is installed in the sun gear hub groove to limit an axial displacement of the piston a second axial direction, opposite the first axial direction.

10. The two-speed pulley assembly of claim 8 further comprising a resilient element arranged to displace the piston in a second axial direction, opposite the first axial direction, to disengage the second conical surface form the first conical surface.

11. The two-speed pulley assembly of claim 8 wherein the electromagnet is fixed to the output plate.

12. The two-speed pulley assembly of claim 8 wherein the pulley comprises a pulley outer diameter and the electromagnet comprises an electromagnet inner diameter, greater than the pulley outer diameter.

13. The two-speed pulley assembly of claim 8 wherein the first conical surface and the second conical surface are disposed radially outside of and at least partially axially aligned with the electromagnet.

14. The two-speed pulley assembly of claim 1 wherein the two-speed pulley assembly comprises a sealed chamber for filling with a lubricating oil.

15. The two-speed pulley assembly of claim 14 wherein the at least one planetary pin comprises a plurality of flow channels for distributing the lubricating oil.

* * * * *